March 26, 1963 H. J. BRAZIER 3,082,620
INTERFACE DETECTOR
Filed Feb. 29, 1960 4 Sheets-Sheet 1

Inventor
Horace James Brazier
By Luck & Luck
Attorney

March 26, 1963  H. J. BRAZIER  3,082,620
INTERFACE DETECTOR
Filed Feb. 29, 1960  4 Sheets-Sheet 3
FIG. 3.
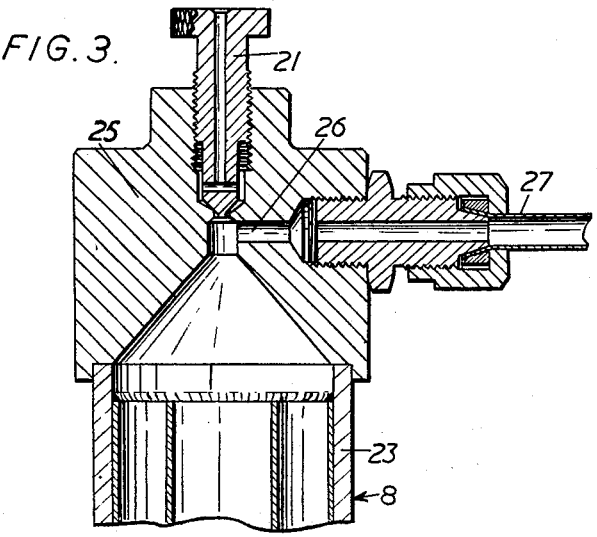
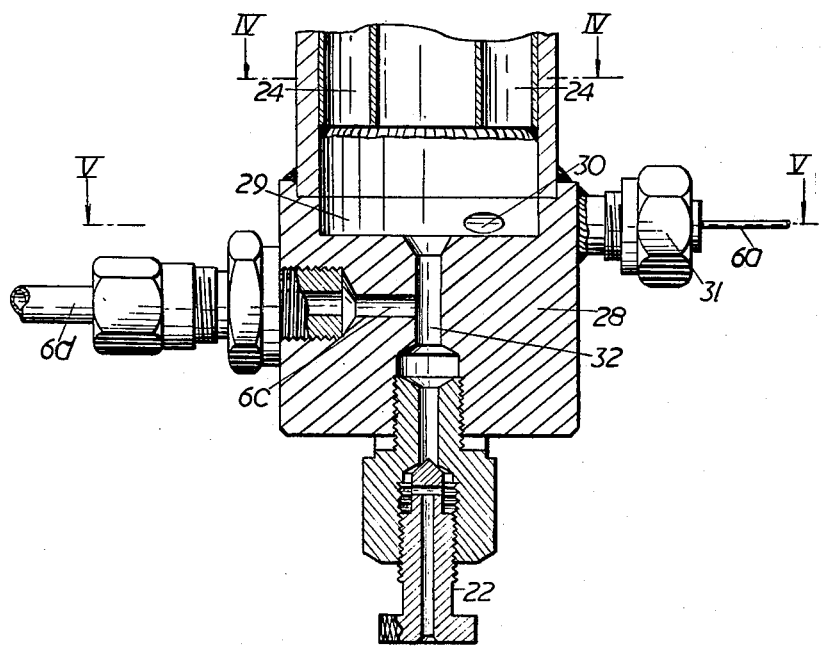
Inventor
Horace James Brazier
By Lucke & Lucke
Attorney

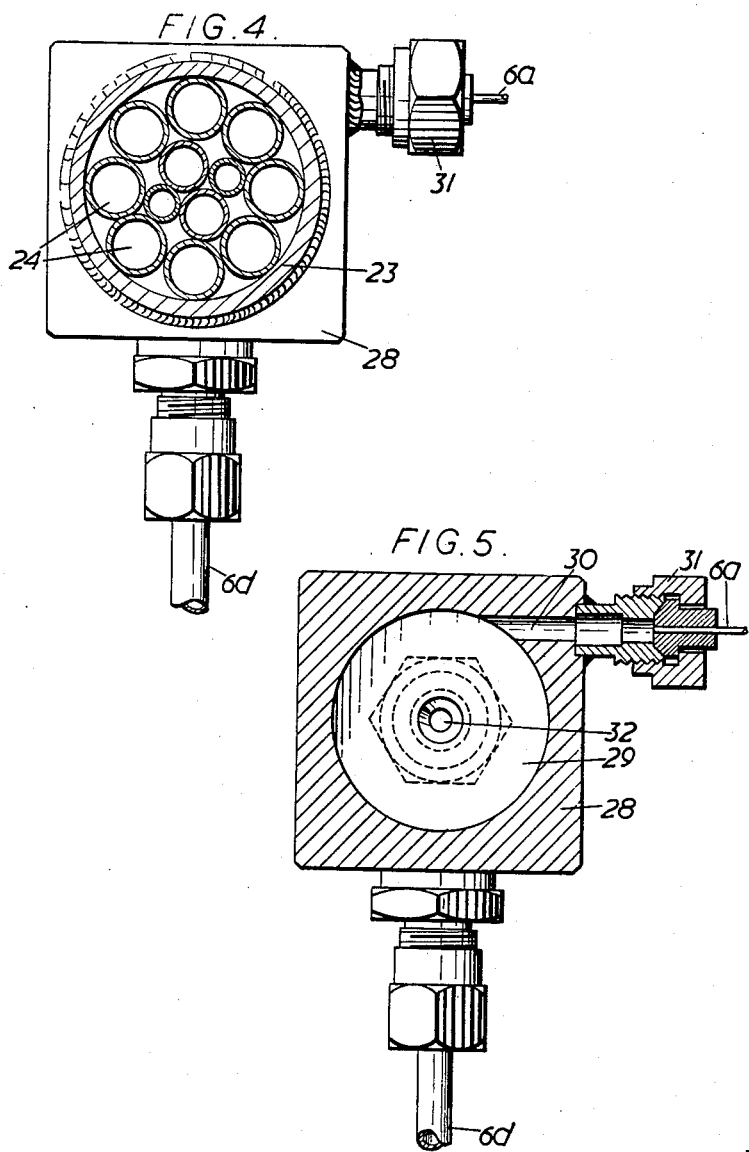

United States Patent Office 3,082,620
Patented Mar. 26, 1963

3,082,620
INTERFACE DETECTOR
Horace James Brazier, Ealing, London, England, assignor to The Sandall Precision Company Limited, Bletchley, England, a British company
Filed Feb. 29, 1960, Ser. No. 11,663
Claims priority, application Great Britain Feb. 27, 1959
9 Claims. (Cl. 73—54)

This invention concerns the detection of interfaces between different fluids flowing consecutively through a pipeline.

Fluids, particularly liquids such as crude oil and petroleum products, are often transported through long distances by pipelines and very often one pipeline is used for the transport of several different fluids, the different fluids following one another immediately and without any separation. The junction between two such fluids consists of a mixture of the two fluids known as an "interface" and this occupies a certain length of the pipeline, which length tends progressively to increase as the interface travels along the pipeline.

When the fluid is in a state of turbulent flow in the pipeline, the interface is of relatively short length; on the other hand, if the flow is laminar the interface may be so long that there is no true interface existing after it has travelled a considerable distance along the pipeline, but only a slow change in fluid mixture composition as the second fluid washes the first fluid out of the pipeline. A typical interface, with turbulent flow, in the case of a liquid such as crude oil, may occupy a length of 60 feet after it has travelled through a distance of a mile in the pipeline. With a flow rate of five feet per second, the interface would pass a detection point in 12 seconds.

When different fluids are successively transported by a pipeline without separation it is of course necessary to detect the arrival of an interface between such fluids at the delivery end of the pipeline so as to be able to divert the second fluid to its individual destination thereby to separate the transported fluids from one another. An object of the present invention is to provide a method of detecting an interface existing between fluids flowing in a pipeline, such fluids having different values of a property, physical or chemical, that may be continuously determined. A further object of the invention is to provide apparatus for performing the method of the invention.

Before discussing the method of the present invention, it is pertinent to note that an interface could be detected by continuously monitoring the value of a physical or chemical property of the fluids and which has different values for the two fluids forming the interface, thereby to produce an indication of the interface by detection of a change in the value of the property concerned as the interface passes the detection point. However, the change in value of a convenient property being so monitored would often be of a very low order requiring the use of a sensitive monitoring instrument for detecting the change and which, in many cases, would respond to changes in flow conditions or changes in other properties, that occur from time to time in the course of transport of fluids in a pipeline, to mask changes in the monitored property due to the passage of an interface past the detection point or to produce spurious indications of changes in the monitored property.

For instance, if the property being monitored were the viscosity of the fluid and the viscosity were signified by the pressure differential existing across a restriction in the pipeline or in a suitable detection circuit, changes in fluid pressure or velocity in the pipeline and especially changes of temperature in the fluid could easily give rise to masking of the effects of the passage of an interface past the detection point as to spurious indications of such passage of an interface. Also, gradual changes of the property being monitored, due for instance to stratification of the fluid in a container from which it is transported by the pipeline, could give rise to spurious or misleading indications.

The method of the present invention comprises continuously detecting the value of a suitable property of the fluid flowing in a pipeline, at detection points effectively spaced apart along the fluid flow path, and monitoring the instantaneous difference between the values so detected.

In carrying out the method of the present invention, the detection points may be physically spaced along the fluid flow path or they may be physically adjacent or coincident and a time delay introduced into the comparison of one detected value with the other, so that at any instant the values being compared are the values of the property for the fluid at points separated in the direction of the fluid flow path.

It will be understood that in the method of the present invention, since it is not the absolute value of a fluid property that is utilised to indicate, by its change, the passage of an interface but instead indication depends on the existence of a difference between the absolute values of such property, at any instant, for fluid at two points effectively spaced apart in the direction of fluid flow, slowly occurring changes in the absolute value of the property will only result in a small instantaneous difference between the values of the property in the fluid at the two detection points.

Accordingly, long term changes in said value can be distinguished from short term changes, resulting from the passage of an interface, by the different magnitudes of value difference obtained in the two cases.

In carrying the invention into practice, it is only necessary to arrange that a difference between the values, at the two detection points, of the fluid property concerned and having a magnitude corresponding to that significant of the passage of an interface gives rise to a signal of appropriate form to indicate the passage of an interface. Long term changes, not due to the passage of an interface, in the absolute value of the property concerned will not then give rise to such a signal.

The fluid property that is utilised in the practice of the present invention must be one whose value can be continuously detected and it must also be one that has a "detectably different" value in the two fluids concerned, "detectably different" meaning a difference in value that can be detected by means capable of continuously detecting the value of such property. In the case of liquids, for instance crude oil and petroleum products, a convenient property is viscosity since the value of this property may be continuously detected by the means sensitive to the pressure drop across a restriction in the flow path of the liquid and the viscosities of different liquids likely to be transported by any particular pipeline usually differ to a sufficient extent for detection of such differences by simple and reliable means.

However, other properties meeting the above criteria may be utilised and amongst the other properties that may be utilised may be mentioned: temperature; density; colour; refractive index; electrical or thermal conductivity; dielectric constant; magnetic permeability; pH.

In most pipelines, the flow conditions are usually constant in the sense that that the flow is either turbulent or laminar and does not change from one of these conditions to the other. Thus the length of pipeline occupied by an interface at any chosen distance from the beginning of the pipeline does not vary a great deal and, in such cases, use can be made of knowledge of the approximate interface length in practising the method of the invention.

Thus it will be appreciated that if the detection points are effectively spaced apart by a distance exceeding the interface length there will be a period during the passage of the interface when it effectively lies wholly between the detection points and the difference in detected values of the fluid property concerned will be a maximum of magnitude equal to the actual difference in value of the property for the two fluids forming the interface.

On the other hand, the greater the effective spacing of the detection points the greater will be the difference between detected values of the property concerned for long term changes of the value of that property; accordingly, to enhance discrimination between such long term changes and the changes due to the passage of an interface the effective spacing of the detection points should be small. From the foregoing, therefore, it is clear that while maximum "sensitivity" of the method is obtained when the detection points are effectively spaced by a distance exceeding the interface length, discrimination between the effects due to an interface and those due to long term changes in the value of the property concerned requires the effective spacing of the detection points to be restricted. Thus for maximum "sensitivity" and maximum discrimination with such "sensitivity," the detection points should be effectively spaced by a distance substantially equal to the interface length.

In cases where the method has to be practised with the utilisation of a fluid property that has only slightly different values for the two fluids forming on interface to be detected, maximum "sensitivity" may be required, making it desirable to space the detection points effectively by a distance substantially equal to the interface length. This will usually be quite practicable if turbulent flow conditions obtain in the pipeline, since the interface length will usually, in such circumstances, be sufficiently short to enable adequate discrimination to be achieved between the effects of long term changes in the property concerned and the effects due to the passage of an interface.

However, in most practical applications of the method of the invention less than maximum "sensitivity" will be required and in such cases the detection points may be effectively spaced apart by a distance less than the interface length in order to enhance the discrimination at the expense of reduced "sensitivity."

Moreover, it should be appreciated that in many situations, especially in the case of pipelines in which laminar flow conditions obtain, it is desirable to detect the "beginning" and "end" of an interface passing the region of the detection points, so that steps may be taken to divert the fluid mixture forming the interface to a destination separate from the destinations of the first and second fluids forming the interface. The method of the invention can be employed for this purpose in those cases in which a difference can be detected between the values of the property concerned at two detection points effectively spaced by a distance considerably less than the interface length. In such situations, a value difference will be detected during a period corresponding to that taken for the travel of the whole interface past one detection point, less the period taken for the travel of any one point in the fluid between the two detection points, so that, if the interface has a length much greater than the effective spacing of the detection points, an indication may be obtained of the length of the interface and of its approximate "beginning" and "end" and steps be taken to divert the interface-forming mixture to its desired destination.

Apparatus in accordance with the present invention for detecting the passage of an interface between two fluids transported by pipeline through a region of such pipeline comprises means for continuously detecting the value of a suitable property of the fluids at each of two detection points effectively spaced apart along the fluid flow path in said region and for deriving a signal significant of the instantaneous difference between the values so detected.

The means for continuously detecting the value of the chosen property naturally depends upon the property whose value is to be detected. Moreover, the property also governs, in some cases at least, the location of the sensing device of the detecting means with respect to the pipeline. Thus, in the case of certain properties, for instance temperature, the means for detecting the value of the property may include a sensing device within the pipeline itself to be directly affected by the fluid in the pipeline, or such means may include a sensing device affected by a sample of fluid continuously withdrawn from the pipeline at an appropriate point. In the case of certain other properties, however, an "external" sensing device affected by a continuously withdrawn sample of the fluid will be necessary.

The detection points may be physically spaced apart along the fluid flow path or they may be physically adjacent or coincident and time delay means associated with one of the detecting means so that the value of the property concerned detected by such means is compared, after a delay, with the instantaneous value of such property as detected by the other such means, whereby effectively the compared values are those of points in the fluid spaced apart along the fluid flow path. If desired, both such arrangements can be adopted to complement one another, the detection points being physically spaced by a chosen distance along the fluid flow path and time delay means associated with the detection means that detect the value of the property concerned in the fluid at the downstream detection point, so that the compared values are those corresponding to values of the property concerned at points in the fluid spaced by a greater distance than the physical separation of the detection points.

As noted hereinabove, a convenient property in the case of liquids is the viscosity and in an embodiment of the present invention the apparatus comprises means for withdrawing a sample of the liquid flowing in the pipeline at a suitable point in the latter and for passing such liquid through a sampling circuit including a suitable restriction across which the pressure drop in the liquid is detected to signify the viscosity of the liquid flowing through the restriction. In theory, there could be two such sampling circuits connected to individual physically spaced detection points, each having a restriction and pressure drop measuring device, associated with a comparison device for comparing the values of the pressure drops across the two restrictions. However, such an arrangement requires that the only differences in the liquid flow conditions in the two circuits should be the measured pressure drops resulting from a difference between the viscosities of the liquids in the two circuits and in practice it would be extremely difficult to achieve maintained identity between the measured pressure drop values in the two circuits for the same viscosity values. In practice, therefore, it is more convenient to withdraw a sample at a single point in the pipeline and to utilise time delay means to establish an effective detection point spacing. For instance, the sample could be passed through a sampling circuit containing a restriction and pressure drop measuring device, time delay means being associated with a comparison device and said measuring device whereby in effect the viscosity value at any instant is compared with a later viscosity value.

Preferably, however, such sample is passed through twin sampling circuits each having a restriction and associated pressure drop measuring device and one such circuit includes a delay circuit upstream of the restriction therein, so that liquid withdrawn from the pipeline at any instant reaches the restriction in one sampling circuit before it reaches the restriction in the other circuit by a suitable time difference.

Such a delay circuit may, for instance, comprise a vessel of appropriate volume in the sampling circuit concerned, such vessel being equivalent to a sampling circuit portion of greater cross-sectional area than the remainder of the circuit and through which the liquid velocity is lower than in the remainder of the circuit. Since it is necessary that notional elementary bodies of liquid entering such vessel should leave the vessel in the same order and with the same composition, thereby to preserve at the restriction in the sampling circuit concerned the same rates of change of viscosity as in the liquid withdrawn from the pipeline and entering the vessel, such vessel is preferably so arranged that mixing of incoming liquid with liquid already in the vessel is minimised. Thus, in a preferred construction, the vessel comprises a cylindrical tube divided internally into a number of parallel longitudinal flow passages to minimise transverse flow of liquid in the vessel and preferably the inlet to such vessel is arranged to impart a swirl to the incoming liquid, so that it is uniformly distributed amongst said flow passages and tends to travel through each at the same means velocity. Thus, preferably, the inlet to the vessel is substantially tangential to the wall thereof and has its axis lying in a diametral plane of the vessel.

As noted above, in the preferred form of apparatus for detecting an interface between two liquids by comparison of the viscosities of the liquids at effectively spaced detection points a sample of liquid is continuously withdrawn from the pipeline at a single point and divided into two parallel streams through twin sampling circuits each containing a suitable restriction and a device for measuring the pressure drop across such restriction. In such apparatus the two streams are recombined downstream of the restrictions and returned to the pipeline at a suitable point, the sample being withdrawn from the pipeline and forced through the sampling circuits and back into the pipeline by a suitable pump the delivery of which is connected to the sampling circuits.

It will be apparent that such arrangement leads to common values of head pressure and terminal pressure, respectively, for the two circuits so that the flows through the two circuits are not necessarily equal but their ratio is the reciprocal of the ratio of the resistances of the two circuits. Accordingly, if the resistance of each circuit were wholly or substantially that due to the restriction, in the circuit, across which the pressure drop is measured there would be no difference between the pressure drops across such restrictions as a result of differences in the viscosities in the liquid flowing through the restrictions. Thus, in such arrangement it is necessary to arrange that the restriction in each sampling circuit and across which the pressure drop is measured accounts for only part of the resistance of the circuit, the remainder of the resistance in the circuit being of such form and disposition in the circuit that the pressure drop across the restriction varies with the viscosity of the liquid flowing through the restriction notwithstanding the change in flow rate through the circuit resulting from a change in liquid viscosity.

For instance, the restriction may be defined by a suitable sharp-edged orifice the pressure drop across which is mainly dependent upon the flow rate through such orifice and substantially independent of the liquid viscosity, the circuit further including a tubular passage of such dimensions that the flow therein is laminor whereby the resistance of such passage is a function of liquid viscosity. With such an arrangement, an increase in liquid viscosity in one circuit in comparison with the other circuit results in a corresponding change in ratio of flow rates in the two circuits and a corresponding change in the ratio of the pressure drops across the restrictions in the circuits, the relative reduction in flow rate in the circuit traversed by liquid of higher viscosity leading to a corresponding reduction in the pressure drop across the restriction in such circuit.

Alternatively, each sampling circuit may include two viscosity-sensitive restrictions in series, for instance two tubular passages of dimensions such that the flow therein is laminar whereby the resistance of such passage is a function of liquid viscosity, one circuit including the aforesaid time delay means vessel disposed between the two restrictions in the circuit. It will be apparent that in such arrangement, the pair of restrictions in each circuit constitute a pressure divider, the pressure at the junction between such restrictions having a value between the values of head and terminal pressure, respectively, of the circuit and determined by the ratio of the resistances of the two restrictions; in the circuit containing the time delay means vessel, the ratio of the resistances of the two restrictions in the circuit will be disturbed by the flow of liquid of varying viscosity through the circuit since at any instant one restriction will be traversed by liquid of different viscosity from that traversing the second restriction whilst in the other circuit the liquid traversing the restrictions will have approximately the same viscosity in each restriction at any instant. Thus a withdrawn sample of liquid from the pipeline and having a time-varying viscosity will disturb the ratio of the pressures at the junctions between the two restrictions of the sampling circuits.

From the foregoing it will be understood that the last-described sampling circuit arrangement depends for its action on the presence of time delay means, in one circuit, that, in effect, multiplies for that circuit any viscosity gradient in the other circuit by some selected factor. Thus such time delay means must physically delay the arrival of liquid of a particular viscosity at the second restriction in the one circuit as compared with the time of arrival of such liquid at the second restriction in the other circuit.

On the other hand, the first-described sampling circuit arrangement can either include similar time delay means, in one circuit, upstream of the viscosity-sensitive passage in that circuit, or a time delay can be introduced, by suitable means, between the measurement of the pressure drop across the restriction in one circuit and its comparison with the corresponding pressure drop value, at the time of comparison, across the restriction of the other circuit. However, in the latter case conditions in the two sampling circuits at any time will be identical and one such circuit could be eliminated; in the remaining circuit the pressure drop across the restriction could either be detected by a suitable device adapted to transmit instantaneous and delayed signals to a comparison device or the pressure drop could be detected by individual devices of different response rates connected to a comparison device.

Since the difference in viscosity between two liquids forming an interface may be masked by a corresponding difference in temperature between the two liquids, apparatus of the form discussed above desirably incorporates means for sensing the temperature of the liquid at detection points effectively spaced apart along the liquid flow path in the pipeline. For instance, in the preferred form of apparatus described above, each of the twin sampling circuits may contain a temperature-sensitive device, such as a thermistor or resistance wire, in contact with the liquid near the downstream end of the circuit, these devices being wired in the arms of a resistance bridge circuit, the out-of-balance current in such circuit being utilised to signal the temperature difference between the liquids in the two circuits and to enable an indicated viscosity difference between the liquids due to a corresponding temperature difference to be recognised as such.

Although it is preferred, at present, to utilise viscosity changes in the practice of the method of the invention in the case of liquids, it is, as has been mentioned, quite possible to utilise other properties in suitable cases. Thus temperature is a property that could often be utilised and in such case the detecting means would include suitable temperature sensing devices, conveniently devices such as thermistors, resistance thermometers or thermocouples that give rise to electrical responses significant of temperature and which can be wired in a bridge circuit that becomes unbalanced when a temperature difference exists between the fluid at effectively spaced detection points.

Such devices can either be located in sampling circuits or in the pipeline itself and the effective spacing of the detection points can result from a physical spacing of such points or from the incorporation of time delay means equivalent in function to the various forms of such means discussed above in connection with apparatus utilising viscosity changes.

Additionally, however, in the case of temperature sensing devices, time delay means of a form resulting in thermal inertia in the response of one device to temperature changes may be adopted.

Thus, for instance, two temperature sensing devices could be located adjacent to one another in the pipeline itself or in a single sampling circuit, one such device being rapidly responsive to temperature changes in the fluid passing it while the other such device is sheathed or otherwise separated from the fluid passing it by a barrier material of low thermal conductivity and/or of high specific heat so as to retard the response of the device to temperature changes in the fluid.

An embodiment of the invention particularly adapted for the detection of interfaces in pipelines for the transport of liquids such as crude oil and petroleum products is illustrated, by way of example, in the accompanying drawings, in which:

FIGURE 3 is a longitudinal sectional view of the time delay vessel of the apparatus;

FIGURE 4 is a section on the line IV—IV of FIGURE 3; and

FIGURE 5 is a section on line V—V of FIGURE 3.

Figure 1:
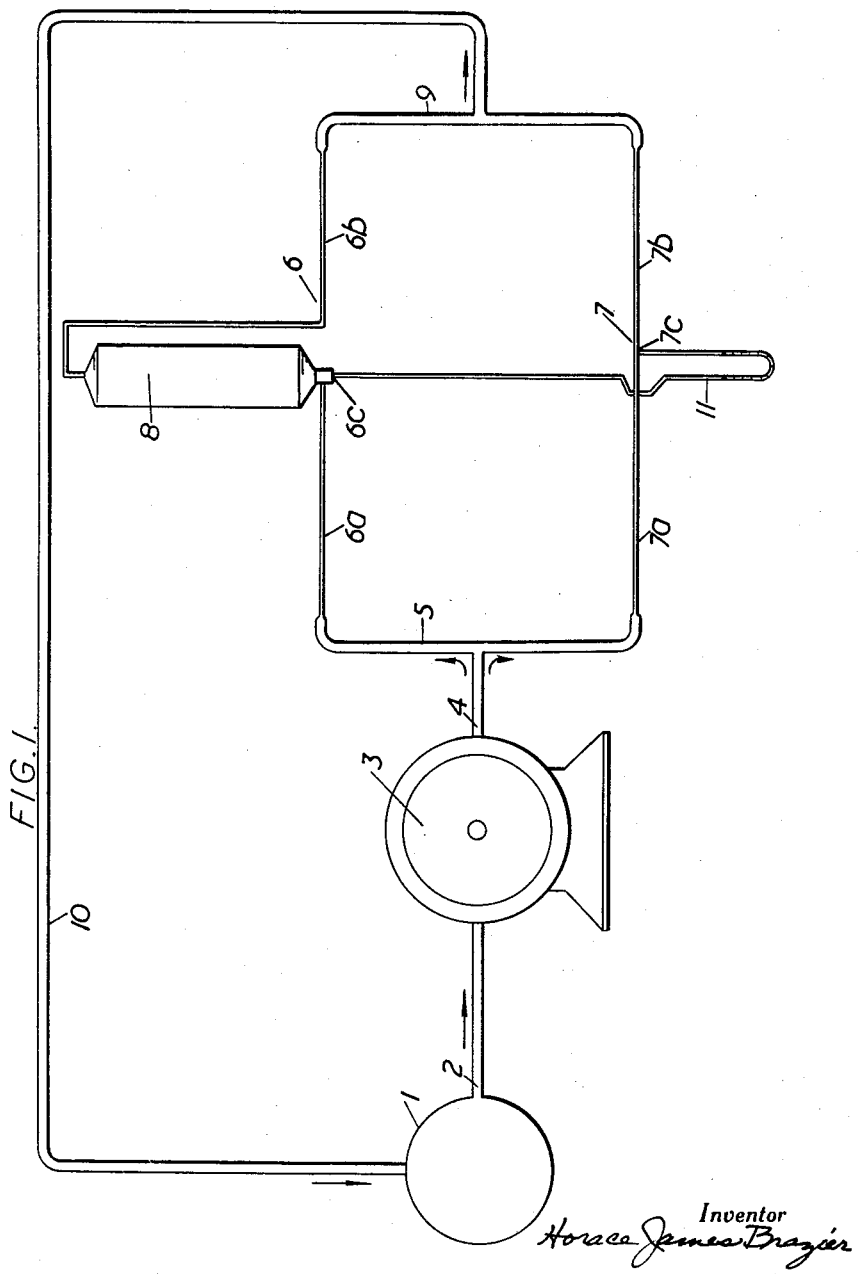
FIGURE 1 is a schematic diagram illustrating the sampling circuit arrangement of the embodiment.

Referring to the drawings, FIGURE 1 shows schematically the liquid circuit of an embodiment of apparatus in accordance with this invention for detecting interfaces between liquids flowing in a pipeline by detecting changes in the viscosity in the liquid flowing through a particular region of the pipeline. In this figure, the pipeline is shown diagrammatically in transverse section at 1 and, at a suitable point in its wall, is provided with a branch 2 through which a sample of the liquid in the pipeline is continuously drawn off by means of a pump 3 which has its delivery 4 connected to a manifold 5 which divides the liquid sample into two streams flowing through a pair of twin sampling circuits 6, 7 that are identical but for the inclusion in circuit 6 of a time delay course or circuit such as vessel 8. The downstream ends of the circuits 6, 7 are connected to a manifold 9 in which the streams flowing through the two circuits recombine and return to the pipeline 1 via a conduit 10 that enters the pipeline at a suitable point spaced from the branch 2 so that liquid re-entering the pipeline from conduit 10 does not mix with any liquid about to enter the branch 2. Thus, conveniently conduit 10 connects with the pipeline at a point downstream of branch 2.

In this embodiment of the invention, the sampling circuits 6, 7 each comprise two viscosity-sensitive restrictions 6a, 6b and 7a, 7b, respectively, these restrictions most conveniently being formed by lengths of fine bore tubing having such dimensions that the liquid flow therethrough is laminar so that their resistance to liquid flow is a function of the viscosity of the liquid traversing them at any instant. For any given liquid viscosity the ratio of the resistances of the restrictions 6a and 7a is equal to the ratio of the resistances of the restrictions 6b and 7b, so that the circuits 6, 7 are symmetrical in the sense that, for a given pressure differential between the manifolds 5 and 9, the pressures at the junctions 6c, 7c between the two restrictions in each circuit will be equal and of a value, between the values of the pressure in manifolds 5 and 9, determined by the ratio of the resistances of restrictions 6a, 7a to the resistances of the restrictions 6b, 7b.

The time delay vessel 8 in circuit 6 is located between the restrictions 6a and 6b and has a cross-sectional area such that the linear velocity of liquid therein is markedly lower than the linear velocity of the liquid in the remainder of the circuit 6, the vessel 8 also having a volume such that any notional elementary body of liquid entering the vessel after having traversed the restriction 6a takes a selected time to pass through the vessel and reach the restriction 6b of the circuit. Thus, considering any particular liquid portion entering the manifold 5 and being divided between the two circuits 6, 7, one part of such liquid portion will reach the restriction 6b of circuit 6 at an instant that is later, by said selected time, than the instant at which the other part of such liquid portion flowing in circuit 7 reaches restrictcion 7b in that circuit. The dimensions of the vessel 8 are such that said selected time is so correlated with the flow rate in the pipeline 1 and the length of an interface to be detected in such pipeline, that at any instant the liquid in restrictions 6b and 7b of the circuits 6, 7 correspond in composition with liquid in the pipeline 1 at points spaced along the length of the latter by a distance that will provide suitable "sensitivity" to viscosity changes due to the passage of an interface coupled with suitable "discrimination" between such changes and long term viscosity changes in the liquid, all as discussed hereinabove.

The schematic diagram of FIGURE 1 indicates the use of a differential manometer 11 connected to the junctions 6c, 7c between the restricitons 6a, 6b, on the one hand, and 7a, 7b, on the other hand, of the circuits 6 and 7, respectively. From the foregoing description of the resistance relationships of the restrictions 6a, 6b, and 7a, 7b, it will be apparent that the manometer 11 will register no pressure differential when liquid of constant viscosity is flowing through the circuits 6 and 7.

On the other hand, should the liquid sample withdrawn from the pipeline 1 and flowing through the circuits 6, 7 have a time-varying viscosity, e.g. a progressively increasing viscosity, a viscosity gradient will exist in such circuit between manifolds 5 and 9. However, the viscosity gradient will not be the same in both circuits 6 and 7, owing to the presence of the delay vessel 8, which effectively increases the viscosity gradient between the ends of such circuit owing to the longer dwell time of liquid in this circuit as compared with that of liquid in circuit 7. Thus, under such conditions there will be a marked disparity between the viscosities of the liquid in restrictions 6a and 6b of circuit 6, while there will be a much smaller, and usually negligible, disparity between the viscosities of the liquid in restrictions 7a and 7b of circuit 7.

Thus, in the case considered, of progressively increasing viscosity in liquid withdrawn from the pipeline, 1, the viscosity of the liquid in restriction 7a of circuit 7 will only negligibly exceed the viscosity of the liquid in restriction 7b of circuit 7, while, on the other hand, the viscosity of the liquid in restriction 6a of circuit 6 will have a markedly greater value than the viscosity of the liquid in restriction 6b of that circuit. Accordingly, the ratio of the pressure drops across restrictions 6a and 6b will increase, the pressure drop in restriction 6a increasing while the pressure drop across restriction 6b decreases, with the result that the pressure at the junction 6c between restrictions 6a and 6b will fall with respect to the pressure at the junction 7c between restrictions 7a and 7b of circuit 7. The magnitude of this pressure differential between junctions 6c, 7c will be indicated by the manometer 11.

Figure 2:
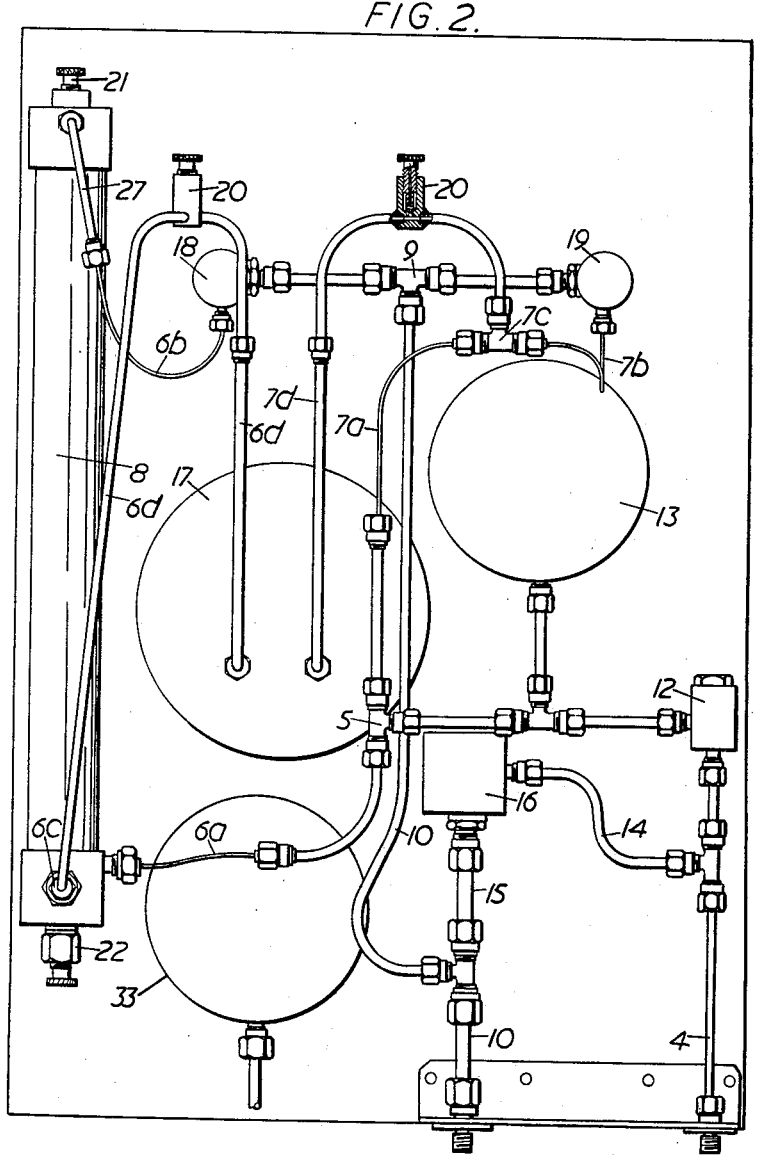
FIGURE 2 is a diagrammatic representation of the layout of the sampling circuit in a practical form and including certain ancillary devices not shown in FIGURE 1.

FIGURE 2 of the drawings shows diagrammatically the layout of a practical form of the circuit portion comprising components 4 to 11 of the schematic arrangement shown in FIGURE 1. Actually, FIGURE 2 is a semi-diagrammatic representation of the rear view of a panel mounting the circuit components and their ancillary devices in a practical installation, the gauge dials and control valves of the devices associated with such components extending through the panel to the front thereof and not being shown in this figure. For convenience, parts of the layout shown in FIGURE 2 which correspond to parts of the layout of FIGURE 1 bear the same references.

Thus, as shown at the bottom righthand corner of FIGURE 2, the pump delivery 4 is connected to the manifold 5 which is in the form of a T-piece with identical lengths of relatively large bore flexible piping connected to its branches and which divides the flow of liquid between the twin sampling circuits 6, 7. However, in this practical arrangement, the pump delivery 4 is connected to the manifold 5 via a filter 12 and between filter 12 and manifold 5 there is a connection to a pressure gauge 13 for indicating the head pressure on the circuits, 6, 7. Additionally, there is a by-pass circuit comprising conduits 14 and 15, linking the pump delivery 4 upstream of filter 12 with conduit 10 via a by-pass control valve 16 that is set to maintain a desired head pressure, lower than the pump delivery pressure, at the manifold 5, so that variations in the pump delivery pressure do not disturb the pressure in manifold 5. A convenient manifold pressure is about 100 pounds per square inch above the pressure in pipeline 1.

The restrictions 6a, 6b, 7a, 7b of the circuits 6, 7 are constituted by lengths of fine bore tubing, conveniently stainless steel tubing; as discussed below, the bore diameter of such tubing should be chosen to give an appropriate flow rate under a desired head pressure in manifold 5, with laminar flow in the tubing, for those liquids between which interfaces are to be detected. For light petroleum products such as aviation fuel and motor spirit, a convenient bore diameter for the tubing is 0.3". The restrictions 6a, 7a, 6b, 7b are conveniently each formed by a piece of such tubing having a length of about 6". A large bore T-piece constitutes the junction 7c between the restriction 7a, 7b of circuit 7 and provides a large bore connection 7d to a differential pressure gauge 17 equivalent in function to the manometer 11 of the arrangement of FIGURE 1.

The delay vessel 8 is arranged vertically with its connection to restriction 6a at its lower end and its connection to restriction 6b at its upper end. A large bore pressure take-off pipe 6d is connected to the lower or inlet end of vessel 8 at a connection which constitutes the junction 6c between restrictions 6a and 6b of circuit 6. Pipe 6d leads to the differential pressure gauge 17.

Although the circuits 6, 7 are apparently symmetrical in construction, in practice it will usually be found that with liquid of the same constant viscosity flowing through these circuits the differential pressure gauge 17 will not read "zero" because of fortuitous variations between the two circuits affecting the theoretical symmetry of the circuits. For calibration purposes, the circuits 6, 7 are therefore connected to a T-piece with identical branch pipes, constituting the manifold 9, via balance-adjusting devices 18, 19 that include needle valves, whereby the flows through two circuits can be adjusted with respect to one another to establish a "zero" reading on the gauge 17 when liquid of the same constant viscosity is flowing through the circuits.

The pipes 6d and 7d each have the form of an inverted U-tube at the highest point of which is located a bleed valve 20 for the purpose of eliminating air or accumulated gases from these pipes, since it will be apparent that the liquid in these pipes is substantially static and is thus incapable of sweeping out any air or liberated gases collecting in the highest points of the pipe 6d, 7d. A similar bleed valve 21 is arranged in the upper or outlet end of the delay vessel 8 for releasing air or gases trapped in the head of this vessel, while a drain valve 22 is located at the lower end of vessel 8 to enable any sediment or dense liquid, such as water, collecting at the lower end of the vessel to be drawn off when appropriate.

The delay vessel 8 of the arrangement of FIGURE 2 preferably has the form shown in detail in FIGURES 3, 4 and 5. Thus, this vessel comprises a cylindrical body 23, arranged vertically as shown in FIGURE 2, having a length of about 19" with an internal diameter of about 1¾". Within the body 23 is a close-packed array of cylindrical longitudinally extending tubes 24 of varying bores ranging from about ⅜" down to about 3/16" and so disposed that the cross-sectional area of the interior of the body 23 is divided into a large number of individual longitudinally extending flow passages. The various tubes 24 have a length of about 18" with their upper ends about ¼" below the upper end of the body 23.

At its upper end the body 23 of the vessel 8 is closed by an end cap 25 having a tapering bore leading to a vent associated with bleed valve 21 and a radial outlet connection 26 to which the fine bore tube constituting restriction 6b is connected via a short length of large bore flexible piping 27.

The lower end of the body 23 of vessel 8 is closed by an end cap 28, having a cylindrical bore portion 29 matching the internal cross-section of the body 23, this bore portion 29 having a tangential inlet 30 with its axis disposed in a diametral plane of the bore portion and connected by coupling 31 to the fine bore tube constituting circuit restriction 6a.

The end cap 28 also has a reduced axial bore portion 32, communicating with a radial passage to the connection leading to the pressure off-take pipe 6d. The bore portion 32 of cap 28 extends downwardly to a vent controlled by the drain valve 22.

The dimensions of the restrictions 6a, 6b, 7a, 7b and of the delay vessel 8 mentioned above have been found suitable for the detection of interfaces in liquids such as light petroleum products, e.g. aviation fuel and motor spirit, flowing in pipelines; with these dimensions and a head pressure in manifold 5 about 100 pounds per square inch above the pressure in pipeline 1, i.e. a pressure gradient of about 100 pounds per square inch in the circuits 6, 7, a combined flow through the sampling circuits 6, 7 of about 10 gallons per hour is obtained and the delay vessel 8 imposes a delay of about 5 minutes between the entry of a notional elementary body of liquid into the vessel and the discharge of such body from the vessel.

In this connection it should be noted that while the time delay imposed by vessel 8 on liquid flowing in circuit 6 is dependent upon the volumetric flow rate of liquid through the circuits 6 and 7 so that the value of this time delay decreases with increasing flow rate, the inherent "sensitivity" of the apparatus to any particular viscosity gradient in the liquid flowing in the pipeline 1 is substantially unaffected by changes in flow rate through the sampling circuits because the pressure differential between junctions 6c, 7c depends not only upon the ratio of the viscosity gradients in the two circuits 6, 7 but also upon the pressure difference between manifolds 5 and 9. This may be understood most readily by considering the effect of increasing the flow rate through the sampling circuits 6, 7 while a particular viscosity gradient exists in the liquid in the pipeline; the increase in flow rate reduces the viscosity gradients in circuits 6, 7 (without disturbing the ratio of the values of these gradients) but it also increases the pressure differential between manifolds 5 and 9. Accordingly, the viscosity gradient reduction in each circuit which would, in itself, tend to reduce the pressure differential between junctions 6c, 7c is offset by the effect of the increased pressure differential between manifolds 5 and 9 which, in itself, tends to raise the pressure differential between junctions 6c, 7c.

Thus, provided the inherent "sensitivity" of the apparatus is sufficient for the detection of an interface between two liquids flowing at a given rate in any particular pipeline with which the apparatus is to be used, variations in the flow rate through the sampling circuits 6, 7 will not substantially affect the ability of the apparatus to detect such an interface; the apparatus is therefore capable of performing reliably over long periods without attention or recalibration.

As previously mentioned, the dimensions of the restrictions 6a, 6b, 7a, 7b need to suit the particular liquids between which interfaces are to be detected. That is, the restrictions must have dimensions such that for the liquids concerned the flow in the restrictions will be laminar when the flow rate is suitable to give rise to a desired value of the time delay imposed by vessel 8 and is produced by a convenient pressure differential between manifolds 5 and 9. In the apparatus shown in FIGURE 2, the restrictions are each constituted by a length of fine bore tubing, and for light petroleum products, such as aviation fuels and motor spirit, such tubing conveniently has a bore diameter of 0.03" as described. However, to use the described apparatus for detecting interfaces between fuel oils, which have viscosities considerably greater than the light petroleum products mentioned above, the tubing constituting the restrictions should have a bore diameter of the order of $1/16-1/8$" for similar values of flow rate and manifold pressure differential to those described. In the case of heavier crude oils and certain lubricating oils, tubing having bore diameters of up to perhaps $1/4$" or more might be needed to obtain similar flow rates and manifold pressure differentials.

In practice, most pipelines are individually reserved for the transport of a particular class of fluids; for instance a pipeline may be used for the transport of light petroleum products or it may be used for the transport of lubricating oils but it would not be used to transport both these classes of liquid. That is, the fluids transported by any one pipeline are not, in practice, likely to have very different viscosities so that apparatus as described with reference to FIGURE 2 may be adapted to the requirements of the fluids transported by any one pipeline merely by equipping the apparatus with restrictions 6a, 6b, 7a, 7b in the form of tubing lengths having bores appropriate to provide a desired flow rate with a suitable pressure differential between the manifolds 5 and 9, for the range of viscosities covering all the fluids to be transported by that particular pipeline.

Moreover, in the event that the viscosity range of fluids transported by a particular pipeline changes as a result of changing the class of fluids to be transported by the pipeline, the apparatus may be quickly adapted to the new range of viscosities merely by changing the restriction tubing and, if necessary, resetting the balance adjusting devices 18, 19.

Reverting to the arrangement shown in FIGURE 2, the differential pressure gauge 17 may be a purely indicating instrument intended to give a visual indication of the pressure differential between connections 6c and 7c but, preferably, for remote indication and/or for providing an "attention-getting" function, the gauge 17 may be coupled to a suitable electrical device to operate a remote indicator and/or an "attention-getter" such as a flashing light or audible signal.

Desirably, the apparatus of FIGURE 2 includes temperature-sensitive devices in contact with the liquid near the downstream end of each circuit 6, 7, such devices responding to the temperature of the liquids in their vicinity and providing a signal significant of any temperature difference between the liquids. Thus, conveniently, each balance adjusting device 18, 19, may include a device such as a temperature-sensitive resistance or a thermistor, these devices being wired in an appropriate resistance bridge circuit that is balanced when the devices are in contact with liquids at the same temperature so that any temperature difference between the liquids results in an out-of-balance condition of the bridge circuit, which condition can be shown by a suitable instrument calibrated in terms of temperature difference.

With such an arrangement, a pressure difference indicated by gauge 17 and due to a viscosity gradient resulting from a temperature gradient in the pipeline liquid may be distinguished from a pressure difference due to the passage of an interface by noting the respective values of pressure and temperature difference and computing, or determining from pre-computed tables, a temperature-corrected viscosity gradient value; only an interface will give rise to a temperature-corrected viscosity gradient value different from zero. Likewise, an indicated temperature difference in the absence of an indicated pressure difference on gauge 17 will signify the passage of an interface in which the pipeline liquid viscosity gradient is zero as a result of a compensating temperature gradient.

FIGURE 2 additionally shows a pressure gauge 33 that is connected to the pipeline to indicate the liquid pressure therein.

The forms of the invention here described and illustrated are presented merely as examples of how the invention may be embodied and applied. Other forms, embodiments and applications of the invention, coming within the proper scope of the appended claims, will of course suggest themselves to those skilled in this particular art.

I claim:

1. For use with a pipeline through which two liquids of different viscosity may flow consecutively, a self-setting apparatus for detecting an interface between such liquids, said apparatus comprising a first and second parallel twin sampling circuit, means for continuously withdrawing a sample of such liquid flowing through a region of such pipeline, means for dividing such withdrawn sample into said sampling circuits, a pair of viscosity-sensitive restrictive conduits disposed in series in each of said circuits, means disposed between each pair of said conduits forming a junction therebetween, a time delay course interposed between said first and second conduits in said second circuit to delay the arrival of the sample flowing therein at its downstream conduit relative to the arrival of the sample flowing in said first circuit at its downstream conduit, the time delay imposed by said course approximating the transit time of an interface of such liquids through such pipeline, and measuring means for comparing pressure values of such samples at said junctions to automatically detect the passage of such interface.

2. An apparatus according to claim 1, in which said delay course includes a delay vessel comprising a plurality of parallel liquid flow paths of common length having a common outlet connection, and a liquid inlet means for distributing incoming liquid uniformly to said flow paths.

3. An apparatus according to claim 2, in which said delay vessel comprises a cylindrical inlet chamber having its axis symmetrical with the inlet ends of said flow paths, and a liquid inlet passage opening into the cylindrical wall of said chamber, the axis of said passage being tangential to such wall and in a diametral plane of such chamber.

4. An apparatus according to claim 3 wherein the ratio of the resistances of said restrictive conduits in said first circuit is equal to the ratio of the resistances of said restrictive conduits in said second circuit when liquid of the same constant viscosity is flowing through both said circuits.

5. An apparatus according to claim 4, including means for sensing the temperatures of the liquids in the respective sampling circuits at corresponding points downstream of said vessel, and means for indicating a difference between contemporary sensed temperature values to enable the reading of said pressure measuring means to be corrected for a temperature gradient in the withdrawn liquid sample.

6. An apparatus according to claim 5 wherein said measuring means is provided with balance-adjusting means to equalize the rate of flow in said circuits when liquid of constant viscosity is passing therethrough, said sensing means is associated with said adjusting means, and signal means is associated with said sensing means to warn of significant thermal differences between contemporary liquids in said conduits.

7. A method for detecting an interface between two liquids of different viscosity flowing consecutively in a pipeline, said method comprising the steps of continuously withdrawing a sample of the liquid flowing through a region of a pipeline, dividing such sample into a first and a second stream, passing said first stream through a first pair of viscosity-sensitive restrictions in series, passing said second stream through a second pair of viscosity-sensitive restrictions in series with an interposed delay circuit to delay the arrival of a second liquid portion at the downstream restriction of said second pair relative to the arrival of a first liquid portion at the downstream restriction of said first pair by a time interval approximating the time required for an interface to pass said pipeline region, and comparing the pressures at the junctions between said two restrictions in said streams.

8. A method according to claim 7, including the steps of measuring and comparing the temperatures of the liquids in both said streams at corresponding points downstream of said delay circuit, obtaining an adjusted pressure difference between said streams by adjusting any difference between such compared pressures relative to any difference between such measured temperatures, then measuring the temperature-corrected viscosity gradients by such adjusted pressure differences and instantaneously registering the passage of an interface between liquids flowing in said streams.

9. A method of detecting an interface between two liquids flowing through a region of a pipeline where the difference between a common detectable property thereof is very small, comprising balancing the flow of one portion of a liquid sample passing through a first hydraulic circuit against a second portion of such sample passing through a second similar parallel circuit, said circuits having a common inlet and a common outlet and normally subject to substantially identical physical disturbances and restrictions, interposing a delay chamber in one of said balanced circuits to retain contemporary liquid therein for a period of time substantially equal to that required for such interface to pass a designated point in such pipeline, calibrating such balanced flow equilibrium on an automatically operated differential indicator and then causing said indicator to signal a warning that such interface is passing said region when the property ratios of such liquid entering said delay chamber differs sufficiently from that of such liquid leaving said chamber to upset the balanced equilibrium between said circuits.

References Cited in the file of this patent

UNITED STATES PATENTS

| | | |
|---|---|---|
| 1,622,794 | Martin | Mar. 29, 1927 |
| 2,315,127 | Mounce | Mar. 30, 1943 |
| 2,674,877 | Silverman et al. | Apr. 13, 1954 |
| 2,716,337 | Fontein | Aug. 30, 1955 |
| 2,934,944 | Eolkin | May 3, 1960 |
| 2,948,145 | Eolkin | Aug. 9, 1960 |